(12) United States Patent
Nam

(10) Patent No.: US 10,652,002 B2
(45) Date of Patent: May 12, 2020

(54) METHOD AND APPARATUS FOR RE MAPPING AND RATE MATCHING FOR 5G NEXT RADIO SYSTEM

(71) Applicant: Samsung Electronics Co., Ltd, Suwon-si (KR)

(72) Inventor: Young-Han Nam, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/104,753

(22) Filed: Aug. 17, 2018

(65) Prior Publication Data

US 2019/0068348 A1 Feb. 28, 2019

Related U.S. Application Data

(60) Provisional application No. 62/552,715, filed on Aug. 31, 2017, provisional application No. 62/560,423, filed on Sep. 19, 2017.

(51) Int. Cl.
*H04L 5/00* (2006.01)

(52) U.S. Cl.
CPC .......... *H04L 5/0053* (2013.01); *H04L 5/0091* (2013.01)

(58) Field of Classification Search
CPC ............................ H04L 5/0053; H04L 5/0091
See application file for complete search history.

(56) References Cited

U.S. PATENT DOCUMENTS

| 2016/0174251 A1* | 6/2016 | Zhang | H04B 7/2656 370/280 |
| 2018/0152964 A1* | 5/2018 | Sun | H04W 72/1273 |
| 2018/0302182 A1* | 10/2018 | Ly | H04L 27/2613 |

(Continued)

OTHER PUBLICATIONS

LTE; Evolved Universal Terrestrial Radio Access (E-UTRA); Physical channels and modulation (3GPP TS 36.211 version 13.0.0 Release 13), ETSI TS 136 211 V13.0.0, Jan. 2016, 143 pages.

(Continued)

*Primary Examiner* — Andrew Lai
*Assistant Examiner* — Harry H Kim

(57) ABSTRACT

A user equipment (UE) for receiving resource information is provided. The UE receives, from a base station (BS), a synchronization signal/physical broadcast channel (SS/PBCH) including a master information block (MIB) and SystemInformationBlockType1 (SIB1) including a first SS/PBCH burst set composition indicator (ssb-PositionsInBurst) that indicates indexes of SS/PBCH blocks for which the UE does not receive other signals or channels in resource elements (REs) that overlap with REs corresponding to the SS/PBCH blocks. The UE further receives a set of higher layer parameters that includes a second ssb-PositionsInBurst indicating the indexes of the SS/PBCH blocks for which UE does not receive the other signals or channels in the REs that overlap with the REs corresponding to the SS/PBCH blocks, and determines the first ssb-PositionsInBurst and the second ssb-PositionsInBurst for receiving resource information. The configuration information included in the second ssb-PositionsInBurst overrides configuration information included in the first ssb-PositionsInBurst.

20 Claims, 9 Drawing Sheets

(56) References Cited

U.S. PATENT DOCUMENTS

2019/0149383 A1* 5/2019 Ko .................. H04W 48/12
370/329
2019/0222368 A1* 7/2019 Yang .................... H04W 56/00

OTHER PUBLICATIONS

"3rd Generation Partnership Project; Technical Specification Group Radio Access Network; Evolved Universal Terrestrial Radio Access (E-UTRA); Multiplexing and channel coding (Release 13)", 3GPP TS 36.212 V13.0.0, Dec. 2015, 121 pages.
"LTE; Evolved Universal Terrestrial Radio Access (E-UTRA); Physical layer procedures (3GPP TS 36.213 version 13.0.0 Release 13)", ETSI TS 136 213 V13.0.0, May 2016, 328 pages.
"LTE; Evolved Universal Terrestrial Radio Access (E-UTRA); Medium Access Control (MAC) protocol specification (3GPP TS 36.321 version 13.0.0 Release 13)", ETSI TS 136 321 V13.0.0, Feb. 2016, 84 pages.
"LTE; Evolved Universal Terrestrial Radio Access (E-UTRA); Radio Resource Control (RRC); Protocol specification (3GPP TS 36.331 version 13.0.0 Release 13)", ETSI TS 136 331 V13.0.0, Jan. 2016, 670 pages.
Ericsson, "Acquisition of Minimum SI", 3GPP TSG-RAN WG2 NR Ad Hoc, Jan. 17-19, 2017, 8 pages, Tdoc R2-1700477.
Samsung, "Remaining aspects of Minimum System Information contents", 3GPP TSG-RAN2 NR Adhoc, Jun. 27-29, 2017, 8 pages, R2-1706830.
Ericsson, "NR-PBCH Content and payload size", 3GPP TSG RAN WG1 Meeting #90, 5 pages, R1-1714035.
Ericsson, "Content of the NR Master Information Block (NR-MIB)" 3GPP TSG-RAN WG2 Ad Hoc on NR#2, Jun. 27-29, 2017, 5 pages, Tdoc R2-1706493.
Samsung, "Remaining aspects of PBCH and SIB1 contents", 3GPP TSG-RAN WG2 99 meeting, Aug. 21-25, 2017, 7 pages, R2-1709496.
International Search Report dated Dec. 6, 2018 in connection with International Patent Application No. PCT/KR2018/010132, 3 pages.

\* cited by examiner

METHOD AND APPARATUS FOR RE MAPPING AND RATE MATCHING FOR 5G NEXT RADIO SYSTEM

CROSS-REFERENCE TO RELATED APPLICATIONS AND CLAIM OF PRIORITY

The present application claims priority to U.S. Provisional Patent Application Ser. No. 62/552,715, filed on Aug. 31, 2017; and U.S. Provisional Patent Application Ser. No. 62/560,423, filed on Sep. 19, 2017. The content of the above-identified patent document is incorporated herein by reference.

TECHNICAL FIELD

The present application relates generally to resource allocation and mapping in wireless communication systems. More specifically, this disclosure relates to resource element mapping and rate matching in 5G next generation wireless communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide multiple services in advanced communication systems.

In one embodiment, a user equipment (UE) for receiving resource information is provided. The UE comprises a transceiver configured to: receive, from a base station (BS), a synchronization signal/physical broadcast channel (SS/PBCH) including a master information block (MIB); receive, from the BS, SystemInformationBlockType1 (SIB1) comprising a first ssb-PositionsInBurst indicating indexes of SS/PBCH blocks for which the UE does not receive other signals or channels in resource elements (REs) that overlap with REs corresponding to the SS/PBCH blocks; and receive, from the BS, a set of higher layer parameters including a second ssb-PositionsInBurst indicating the indexes of the SS/PBCH blocks for which the UE does not receive the other signals or channels in the REs that overlap with the REs corresponding to the SS/PBCH blocks, wherein configuration information included in the second ssb-PositionsInBurst overrides configuration information included in the first ssb-PositionsInBurst. The UE further comprises a processor operably connected to the transceiver, the processor configured to determine the first ssb-PositionsInBurst and the second ssb-PositionsInBurst for receiving resource information.

In another embodiment, a base station (BS) for transmitting resource information is provided. The BS comprises a processor determine a first ssb-PositionsInBurst and a second ssb-PositionsInBurst for transmitting resource information. The BS further comprises a transceiver operably connected to the processor, the transceiver configured to transmit, to a user equipment (UE), a synchronization signal/physical broadcast channel (SS/PBCH) including a master information block (MIB); transmit, to the UE, SystemInformationBlockType1 (SIB1) comprising the first ssb-PositionsInBurst indicating indexes of SS/PBCH blocks; and transmit, to the UE, a set of higher layer parameters including the second ssb-PositionsInBurst indicating the indexes of the SS/PBCH blocks, wherein configuration information included in the second ssb-PositionsInBurst overrides configuration information included in the first ssb-PositionsInBurst.

In yet another embodiment, a method of a user equipment (UE) for receiving resource information is provided. The method comprises receiving, from a base station (BS), a synchronization signal/physical broadcast channel (SS/PBCH) including a master information block (MIB); receiving, from the BS, SystemInformationBlockType1 (SIB1) comprising a first ssb-PositionsInBurst indicating indexes of SS/PBCH blocks for which the UE does not receive other signals or channels in resource elements (REs) that overlap with REs corresponding to the SS/PBCH blocks; receiving, from the BS, a set of higher layer parameters including a second ssb-PositionsInBurst indicating the indexes of the SS/PBCH blocks for which the UE does not receive the other signals or channels in the REs that overlap with the REs corresponding to the SS/PBCH blocks, wherein configuration information included in the second ssb-PositionsInBurst overrides configuration information included in the first ssb-PositionsInBurst; and determining the first ssb-PositionsInBurst and the second ssb-PositionsInBurst for receiving resource information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v13.0.0, "E-UTRA, Physical channels and modulation;" 3GPP TS 36.212 v13.0.0, "E-UTRA, Multiplexing and Channel coding;" 3GPP TS 36.213 v13.0.0, "E-UTRA, Physical Layer Procedures;" 3GPP TS 36.321 v13.0.0, "E-UTRA, Medium Access Control (MAC) protocol specification;" and 3GPP TS 36.331 v13.0.0, "E-UTRA, Radio Resource Control (RRC) Protocol Specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
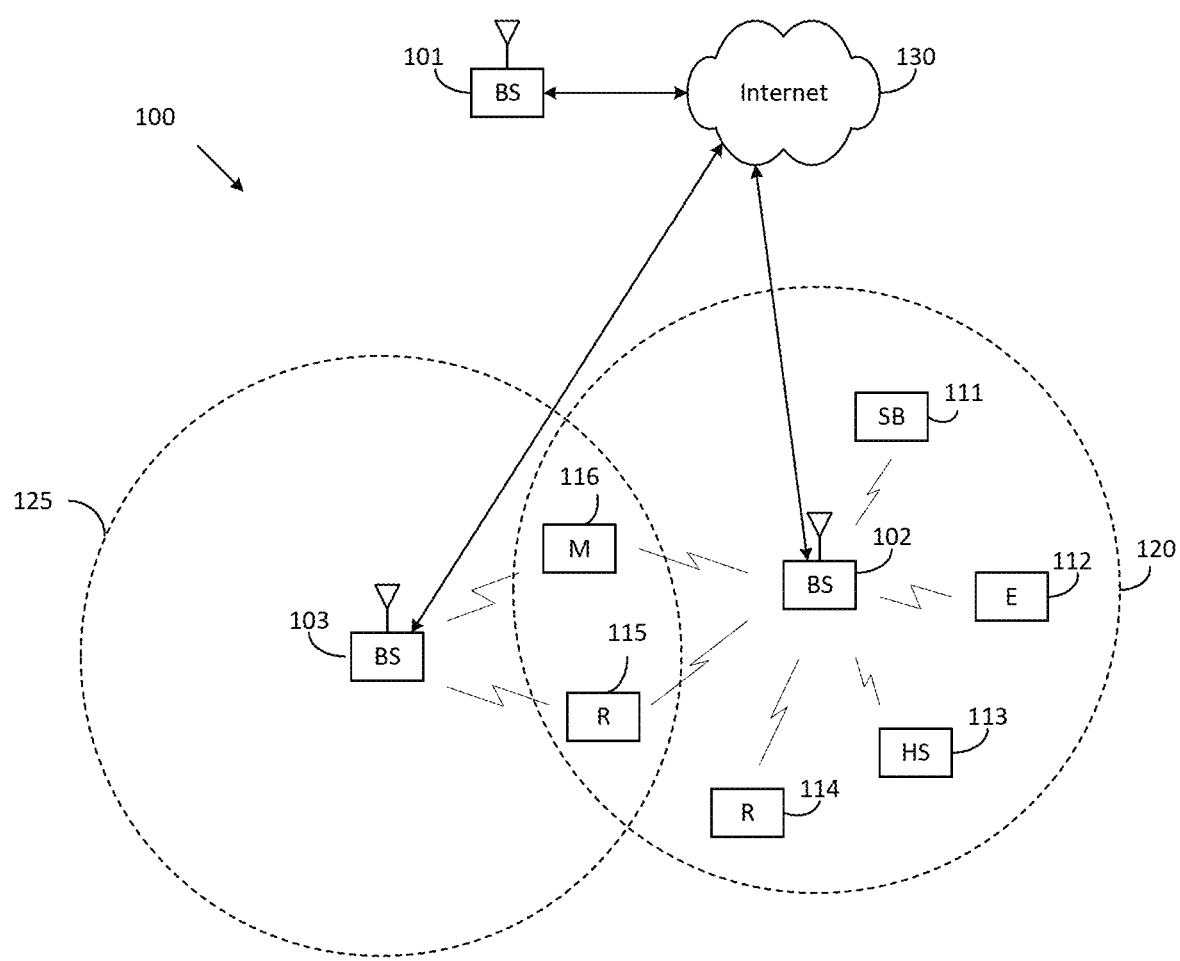
FIG. 1 illustrates an example wireless network according to embodiments of the present disclosure.
Figure 2:
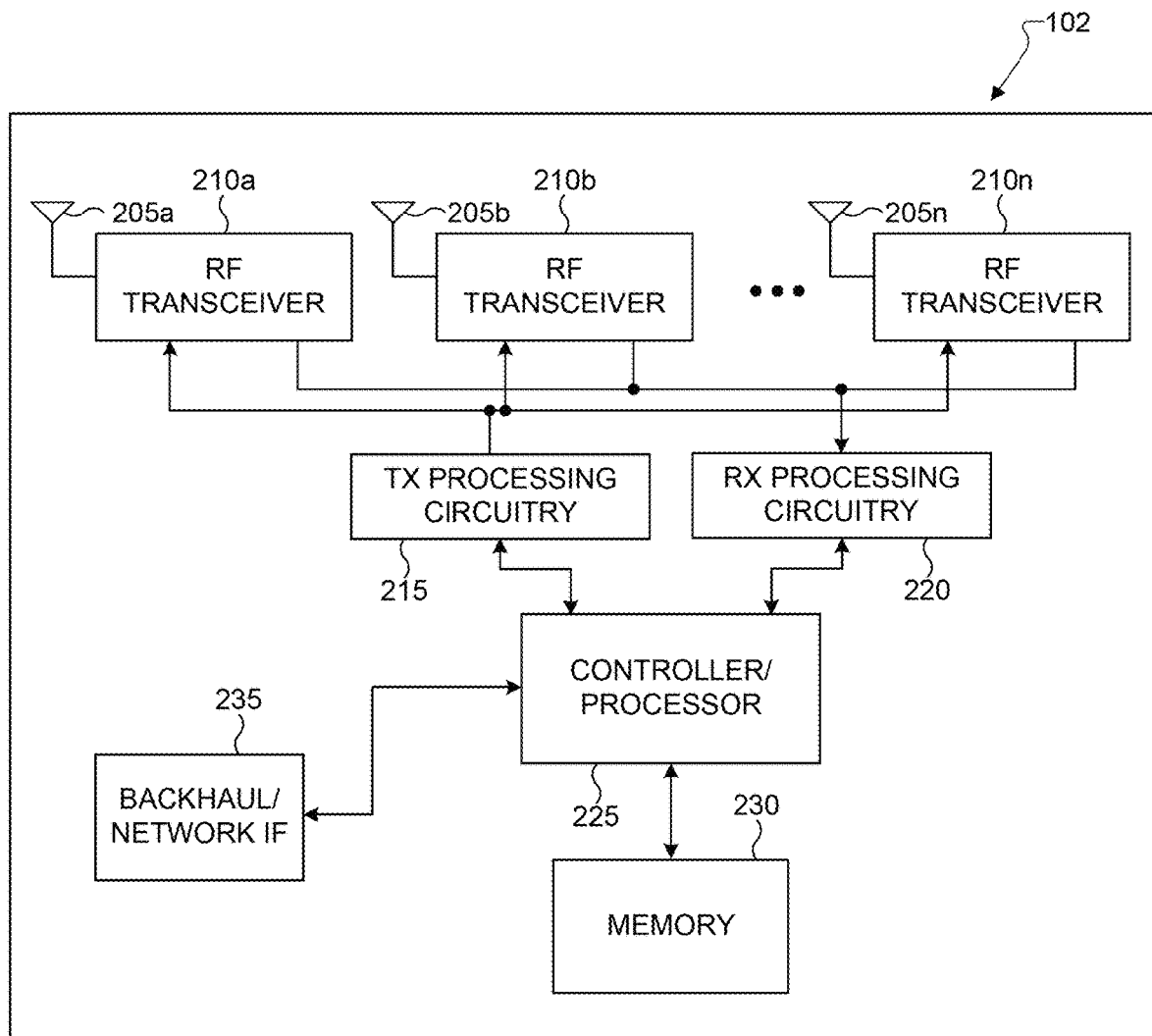
FIG. 2 illustrates an example eNB according to embodiments of the present disclosure.
Figure 3:
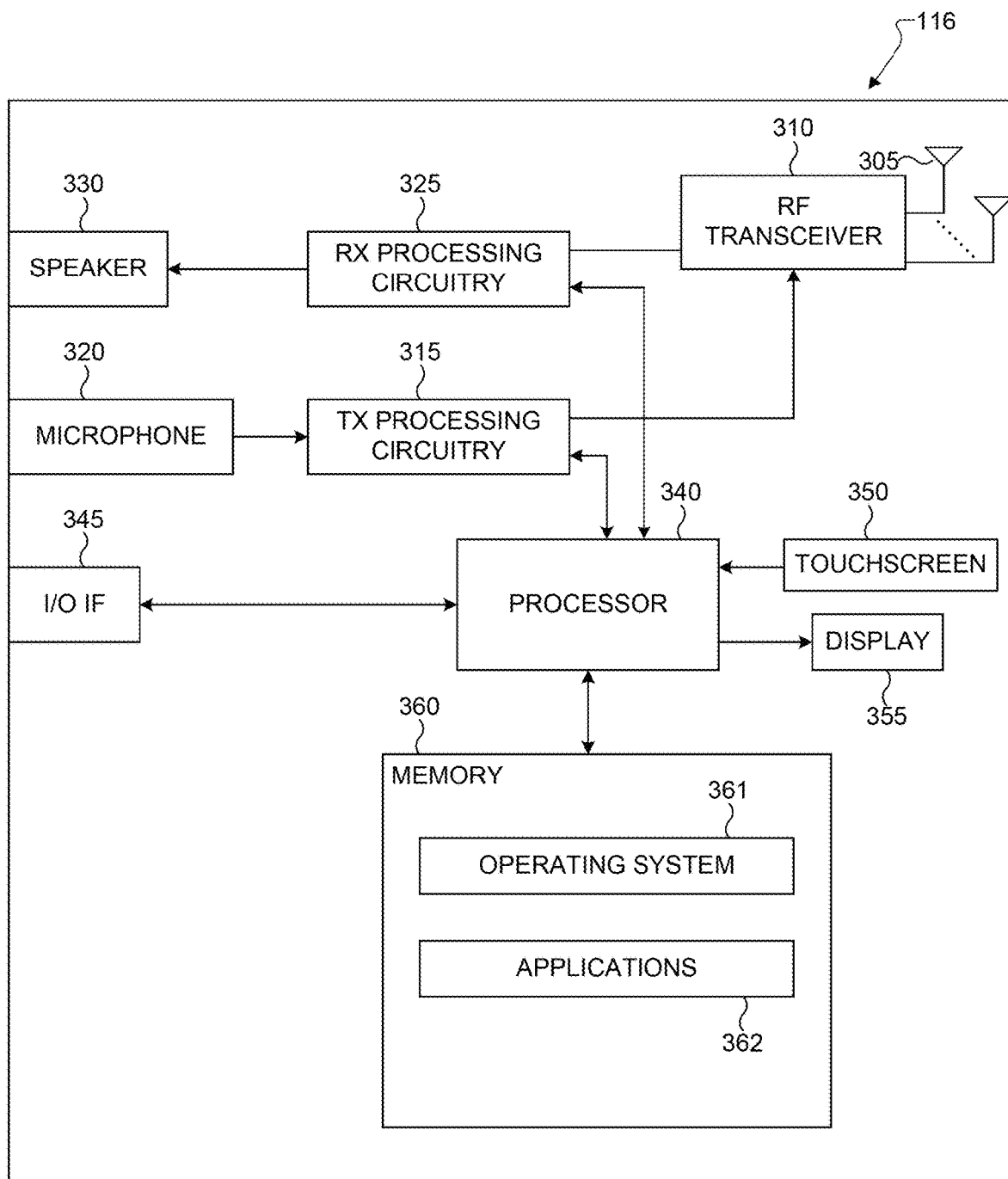
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient RE mapping and rate matching operation in an advanced wireless communication system. In certain embodiments, and one or more of the eNBs 101-103 includes circuitry, programming, or a combination thereof, for efficient RE mapping and rate matching operation in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
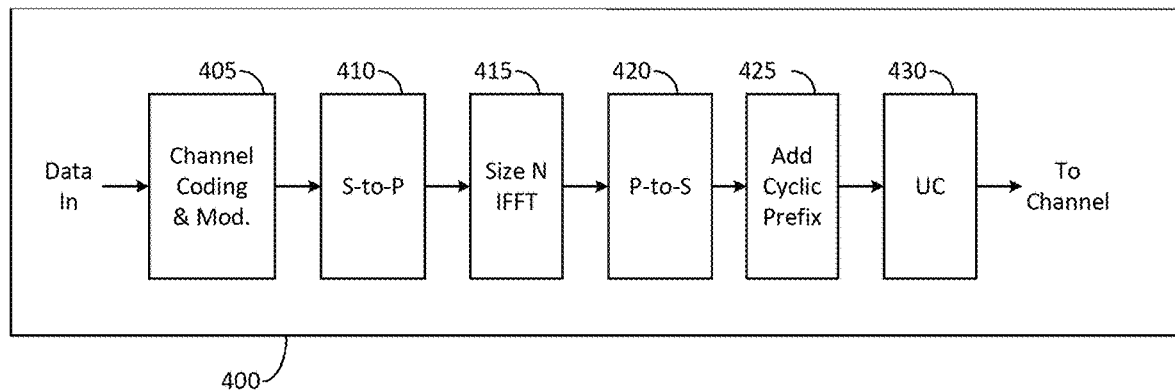
FIG. 4A illustrates an example high-level diagram of an orthogonal frequency division multiple access transmit path according to embodiments of the present disclosure.
Figure 4B:
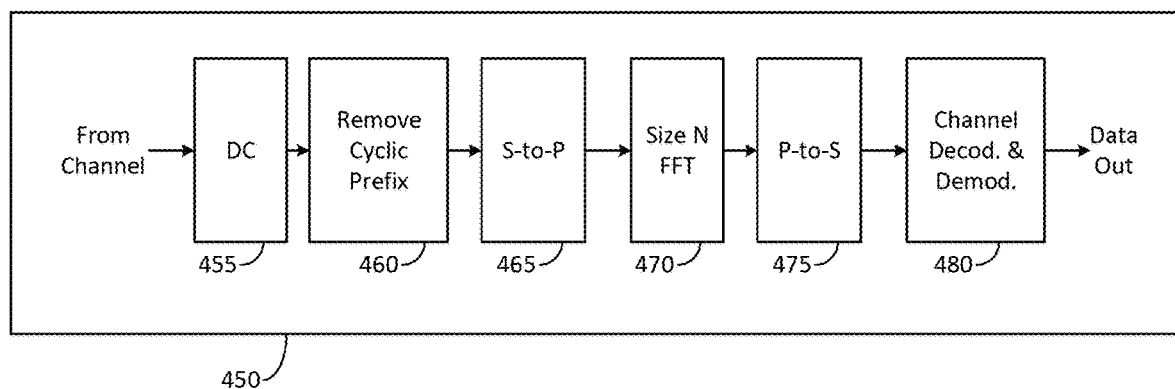
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

In LTE technologies, a time interval X which can contain one or more of the DL transmission part, guard, UL transmission part, and a combination of thereof regardless of they are indicated dynamically and/or semi-statically. Furthermore, in one example, the DL transmission part of time interval X contains downlink control information and/or downlink data transmissions and/or reference signals. In another example, the UL transmission part of time interval X contains uplink control information and/or uplink data transmissions and/or reference signals. In addition, the usage of DL and UL does not preclude other deployment scenarios e.g., sidelink, backhaul, relay). In some embodiments of the current disclosure, "a subframe" is another name to refer to "a time interval X," or vice versa. In order for the 5G network to support these diverse services are called network slicing.

In some embodiments, "a subframe" and "a time slot" can be used interchangeably. In some embodiments, "a subframe" refers to a transmit time interval (TTI), which may comprise an aggregation of "time slots" for UE"s data transmission/reception.

Figure 5:
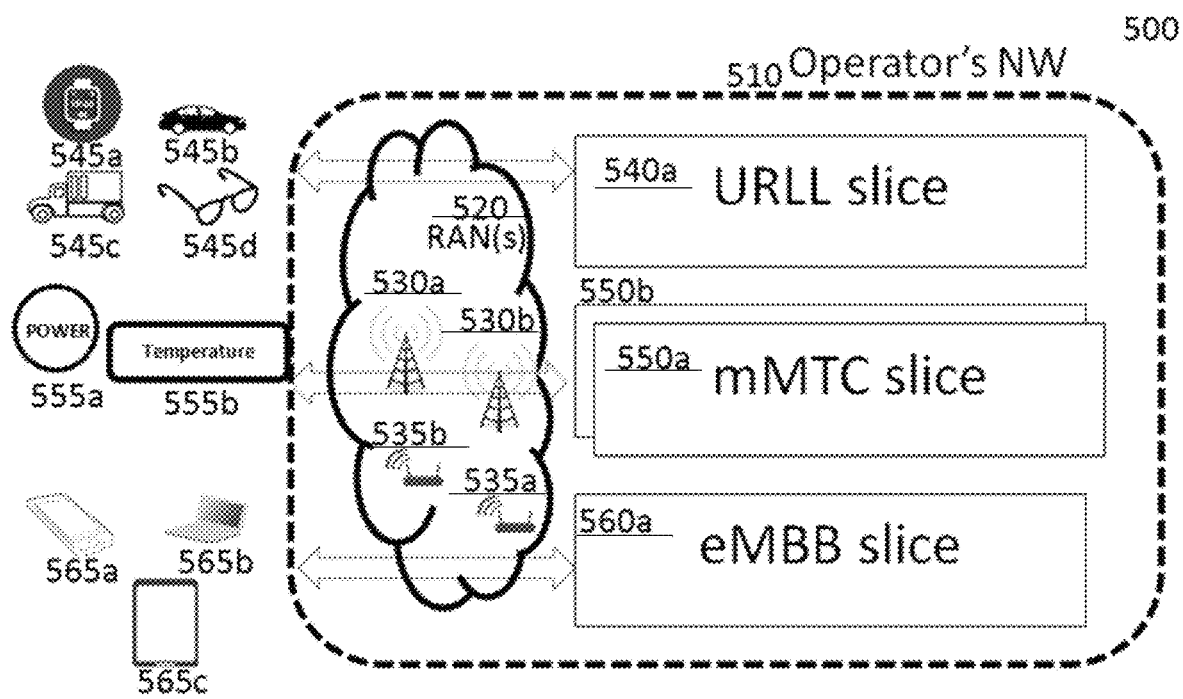
FIG. 5 illustrates an example network slicing according to embodiments of the present disclosure.

FIG. 5 illustrates a network slicing 500 according to embodiments of the present disclosure. An embodiment of the network slicing 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, the network slicing 500 comprises an operator's network 510, a plurality of RANS 520, a plurality of eNBs 530*a*, 530*b*, a plurality of small cell base stations 535a, 535b, a URLL slice 540a, a smart watch 545a, a car 545b, a, truck 545c, a smart glasses 545d, a power 555a, a temperature 555b, an mMTC slice 550a, an eMBB slice 560a, a smart phone (e.g., cell phones) 565a, a laptop 565b, and a tablet 565c (e.g., tablet PCs).

The operator's network 510 includes a number of radio access network(s) 520—RAN(s)—that are associated with network devices, e.g., eNBs 530a and 530b, small cell base stations (femto/pico eNBs or Wi-Fi access points) 535a and 535b, etc. The operator's network 510 can support various services relying on the slice concept. In one example, four slices, 540a, 550a, 550b and 560a, are supported by the network. The URLL slice 540a to serve UEs requiring URLL services, e.g., cars 545b, trucks 545c, smart watches 545a, smart glasses 545d, etc. Two mMTC slices 550a and 550b serve UEs requiring mMTC services such as power meters and temperature control (e.g., 555b), and one eMBB slice 560a requiring eMBB serves such as cells phones 565a, laptops 565b, tablets 565c.

In short, network slicing is a scheme to cope with various different qualities of services (QoS) in the network level. For supporting these various QoS efficiently, slice-specific PHY optimization may also be necessary. Devices 545a/b/c/d, 555a/b are 565a/b/c examples of user equipment (UE) of different types. The different types of user equipment (UE) shown in FIG. 5 are not necessarily associated with particular types of slices. For example, the cell phone 565a, the laptop 565b and the tablet 565c are associated with the eMBB slice 560a, but this is just for illustration and these devices can be associated with any types of slices.

In some embodiments, one device is configured with more than one slice. In one embodiment, the UE, (e.g., 565a/b/c) is associated with two slices, the URLL slice 540a and the eMBB slice 560a. This can be useful for supporting online gaming application, in which graphical information are transmitted through the eMBB slice 560a, and user interaction related information are exchanged through the URLL slice 540a.

In the current LTE standard, no slice-level PHY is available, and most of the PHY functions are utilized slice-agnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

In some embodiments, corresponding PHY designs to cope with different QoS with network slicing concept are disclosed. It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
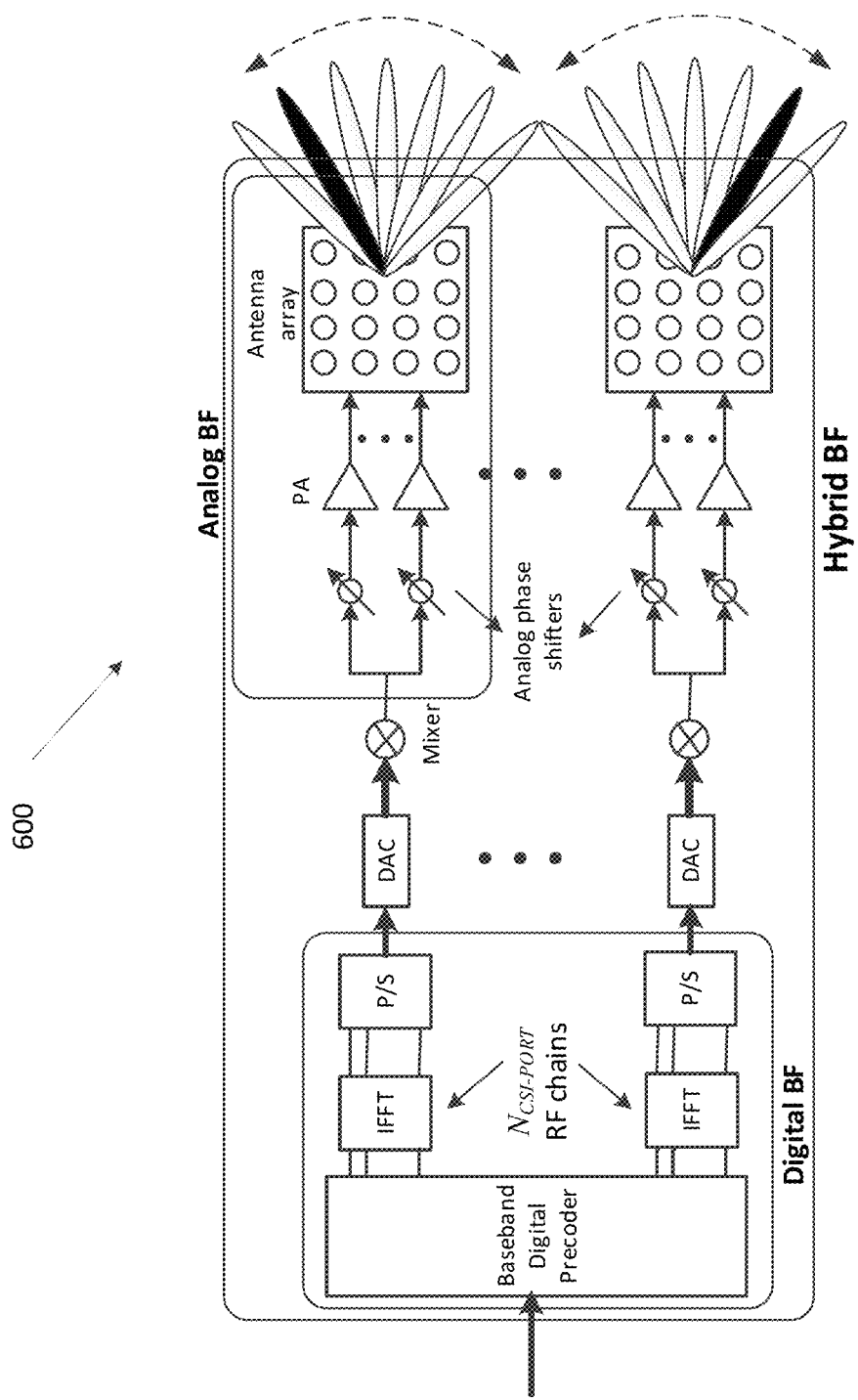
FIG. 6 illustrates an example number of digital chains according to embodiments of the present disclosure.

FIG. 6 illustrates an example number of digital chains 600 according to embodiments of the present disclosure. An embodiment of the number of digital chains 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

LTE specification supports up to 32 channel state information-reference signal (CSI-RS) antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6. In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI\text{-}PORT}$. A digital beamforming unit 610 performs a linear combination across $N_{CSI\text{-}PORT}$ analog beams to further increase precoding gain. While analog beams are wideband (hence not frequency-selective), digital precoding can be varied across frequency sub-bands or resource blocks.

A gNB could utilize one or multiple transmit beams to cover the whole area of one cell. The gNB may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may be feasible for gNB to provide coverage with a single transmit beam, i.e., ensure adequate received signal quality at the UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at UE locations within the coverage area.

However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the gNB may form a number of transmit beams, each providing coverage over a region narrower than the overall coverage region, but providing the transmit power amplification sufficient to overcome the higher signal propagation loss due to the usage of higher transmit signal carrier frequencies.

Figure 7:
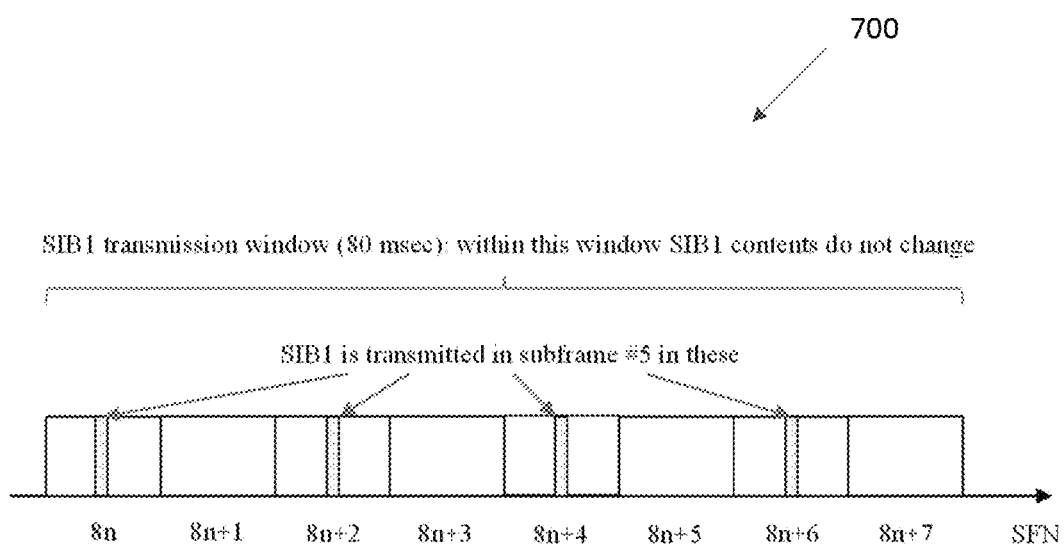
FIG. 7 illustrates an example SIB1 transmission opportunity according to embodiments of the present disclosure.

FIG. 7 illustrates an example SIB1 transmission opportunity 700 according to embodiments of the present disclosure. An embodiment of the SIB1 transmission opportunity 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

The master information block (MIB) uses a fixed schedule with a periodicity of 40 ms and repetitions made within 40 ms. The first transmission of the MIB is scheduled in subframe #0 of radio frames for which the system frame number (SFN) mod 4=0, and repetitions are scheduled in subframe #0 of all other radio frames. For time division duplexing/frequency division duplexing (TDD/FDD) system with a bandwidth larger than 1.4 MHz that supports BL UEs or UEs in CE, MIB transmission may be repeated in subframe #9 of the previous radio frame for FDD and subframe #5 of the same radio frame for TDD.

The SystemInformationBlockType1 uses a fixed schedule with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0. The SIB1 transmission opportunities according to legacy LTE are illustrated in FIG. 7. The other SIBs can be transmitted in only those subframes which are not destined for SIB1 transmissions.

The SI messages are transmitted within periodically occurring time domain windows (referred to as SI-windows) using dynamic scheduling. Each SI message is associated with a SI-window and the SI-windows of different SI messages do not overlap. That is, within one SI-window only the corresponding SI is transmitted. The length of the SI-window is common for all SI messages, and is configurable. Within the SI-window, the corresponding SI message can be transmitted a number of times in any subframe other than MBSFN subframes, uplink subframes in TDD, and subframe #5 of radio frames for which SFN mod 2=0. The UE acquires the detailed time-domain scheduling (and other information, e.g. frequency-domain scheduling, used transport format) from decoding SI-RNTI on PDCCH).

For UEs other than BL UE or UEs in CE SI-RNTI is used to address SystemInformationBlockType1 as well as all SI messages. SystemInformationBlockType1 configures the SI-window length and the transmission periodicity for the SI messages.

In one embodiment, when acquiring an SI message, the UE may determine the start of the SI-window for the concerned SI message as follows: for the concerned SI message, determine the number n which corresponds to the order of entry in the list of SI messages configured by schedulingInfoList in SystemInformationBlockType1; determine the integer value x=(n−1)*w, where w is the si-WindowLength; and the SI-window starts at the subframe # a, where a=x mod 10, in the radio frame for which SFN mod T=FLOOR(x/10), where T is the si-Periodicity of the concerned SI message. E-UTRAN may configure an SI-window of 1 ms only if all SIs are scheduled before subframe #5 in radio frames for which SFN mod 2=0.

In one embodiment, when acquiring an SI message, the UE may receive DL-SCH using the SI-RNTI from the start of the SI-window and continue until the end of the SI-window whose absolute length in time is given by si-WindowLength, or until the SI message was received, excluding the following subframes: subframe #5 in radio frames for which SFN mod 2=0; any MBSFN subframes; and/or any uplink subframes in TDD.

In one embodiment, when acquiring an SI message, the UE may repeat reception at the next SI-window occasion for the concerned SI message if the SI message was not received by the end of the SI-window.

In one embodiment, common PRB indexing is used at least for DL BWP configuration in RRC connected state. The reference point is PRB 0, which is common to all the UEs sharing a wideband CC from network perspective, regardless of whether they are NB, CA, or WB UEs. An offset from PRB 0 to the lowest PRB of the SS block accessed by the UE is configured by high layer signaling. The common PRB indexing is for maximum number of PRBs for a given numerology defined in LTE specification.

In one embodiment, the actually transmitted SS blocks is indicated in remaining minimum system information (RMSI) for both sub6 GHz and over6 GHz cases. Indication is in compressed form in above 6 GHz case. Indicated resources are reserved for actually transmitted SS blocks. Data channels are rate matched around actually transmitted SS blocks. Also, UE-specific RRC signaling with full bitmap can also be used for indicating the actually transmitted SS blocks for both sub6 GHz and over6 GHz cases.

Then, as there are two different signaling for indicating the actually transmitted SS blocks, when to assume which rate matching assumption may be applied needs to be decided. The present disclosure provides novel designs for this problem.

In the present disclosure, SS burst set composition may refer to SS block mapping in a half frame. SS burst set composition may be referred to as ssb-PositionsInBurst. RMSI may be referred to as system information block1 (SIB1).

In one embodiment, the uncertainty for the UE operation is resolved according to as in the following. There are three different SS burst set composition to consider at the UE side: full SS burst set composition of the carrier band, a first SS burst set composition which is indicated by the RMSI, and a second SS burst set composition indicated by the RRC. When the UE receives a PDSCH, the UE may apply the rate matching and RE mapping around the SS blocks, based on the selected SS burst set composition. In other words, the UE does not receive the PDSCH in REs that overlap with REs corresponding to the indicated SS/PBCH blocks.

DCI carries at least an RNTI field, which indicates for what purpose DCI is used for. In one example, if C-RNTI (also known as a UE-ID) is used, the PDSCH/PUSCH scheduled by the DCI is a UE-specific dedicated one. In another example, if SI-RNTI is used, the PDSCH scheduled by the DCI is a cell-specific one, and the PDSCH carries the system information. In yet another example, if RA-RNTI is used, the PDSCH scheduled by the DCI is used for RACH responses.

The DCI containing C-RNTI is received during CONNECTED mode. The DCI containing SI-RNTI, P-RNTI can be received in all of CONNECTED & IDLE mode, and also during initial cell selection. The DCI containing temporary C-RNTI, RA-RNTI can be received during RACH procedure, either in initial cell selection, or during handover. Seeing the use cases of different RNTI types for different purposes, it is proposed that the types of RNTI contained in DCI determine the rate matching behavior for the corresponding PDSCH/PUSCH.

When a first type of RNTI is used for a DCI, the rate matching and RE mapping for the scheduled PDSCH/PUSCH is based on a first indicated value; and when a second type of RNTI is used for a DCI, based on a second indicated value.

One illustrative example of this embodiment is as follows. During the initial cell selection, the UE receives DCI via PDCCH in a CORESET, and the PDCCH indicates a PDSCH containing RMSI (or SIB1). As PBCH (or MIB) does not carry any information on the transmitted SS block, UE may assume the default SS burst set composition for the rate matching and RE mapping to receive the PDCCH. In this disclosure, "rate matching" may imply "rate matching and RE mapping."

Upon the UE receives the RMSI, which contains a first indication on the SS burst set composition, the UE's PDSCH rate matching and RE mapping can be made dependent on the RMSI-signaled SS burst set composition. The DL indications received during this phase (after RMSI reception but before receiving the RRC signaling regarding the updated SS burst set composition) include RACH responses (msg2, msg4) and SIBx, x>1. Hence, it is proposed that the PDSCHs carrying SIBx, x>1 and RACH responses (msg2, msg4) may be rate matched around the SS blocks indicated by the first indication of the SS burst set composition. To realize this operation dependent upon the RNTI types, a separate RNTI may be assigned to SIB1 (or RMSI) and SIBx, x>1.

As for the paging, a similar treatment as SIBx, x>1 is desirable, as the paging PDSCH can be received in CONNECTED & IDLE mode. Hence, if the RNTI type is P-RNTI, the UE may use the first indication of the SS burst set composition for PDSCH RE mapping and rate matching.

A UE may also receive a second indication by RRC signaling on the SS burst set composition in the CONNECTED mode. As the purpose of this indication is to facilitate UE's PDSCH reception on these non-serving SS block time frequency resources in the same cell, this information is UE-specific. Hence, it is not proper to use the second indication for the rate matching and RE mapping for the cell-specific signaling. The use of the second indication may be restricted to the UE-specific PDSCH reception only. In other words, when the UE receives DCI with C-RNTI, which schedules a PDSCH, the UE may assume that the PDSCH is rate matched around the SS blocks (and the PDSCH RE mapping is around the SS blocks) indicated by the second indication.

The rate matching and PDSCH RE mapping behavior for the PDSCH/PUSCH is determined based on the PDSCH contents and/or RNTI types as shown in TABLE 1. The "full" SS burst set of the carrier band is used for RMSI PDSCH reception, which is scheduled by DCI with SI-RNTI for SIB1. The first indication carried in RMSI is used for SIBx, RACH msg2/4 and paging reception, which is scheduled by DCI with SI-RNTI for SIBx (x>1), RA-RNTI, temporary C-RNTI, P-RNTI. The first indication may also be used for UE-specific dedicated message reception, which is scheduled by DCI with C-RNTI until the UE receives the RRC signaling containing the second indication. The second indication is used for UE-specific dedicated message reception, which is scheduled by DCI with C-RNTI, after the UE receives the second indication of the SS burst set composition via RRC signaling.

TABLE 1

Components for the RE mapping and rate matching

| PDSCH contents | CORESET type | RNTI types | Rate matching and RE mapping |
| --- | --- | --- | --- |
| RMSI | MIB configured CORESET | SI-RNTI for SIB1 (or RMSI) | Behavior 1: Full SS burst set of the carrier band |
| SIBx, RACH msg2/4, paging | MIB/RMSI configured CORESET | SI-RNTI for SIBx (x > 1), RA-RNTI, temporary C-RNTI, P-RNTI | Behavior 2: According to a first indication of the SS burst set composition carried in RMSI |
| UE-specific dedicated message | RRC configured CORESET or MIB/RMSI configured CORESET | C-RNTI | Behavior 3: According to a first indication of the SS burst set composition carried in RMSI, if a second indication by RRC is not received; according to a second indication of the SS burst set composition carried in RMSI, if the second indication by RRC has been received |

An alternative embodiment is described in TABLE 2. The rate matching and PDSCH RE mapping behavior for the PDSCH/PUSCH is determined based on the CORESET type and/or RNTI types, rather than the PDSCH contents and/or RNTI types. The "full" SS burst set of the carrier band is used for RMSI PDSCH reception, which is scheduled by DCI with SI-RNTI for SIB1 carried in MIB configured CORESET.

The first indication carried in RMSI is used for SIBx, RACH msg2/4 and paging reception, which is scheduled by DCI with SI-RNTI for SIBx (x>1), RA-RNTI, temporary C-RNTI, P-RNTI carried in MIB configured CORESET. The first indication may also be used for UE-specific dedicated message reception, which is scheduled by DCI with C-RNTI carried in MIB configured CORESET; or in RRC configured CORESET until the UE receives the RRC signaling containing the second indication. The second indication is used for UE-specific dedicated message reception, which is scheduled by DCI with C-RNTI carried in the RRC configured CORESET, after the UE receives the second indication of the SS burst set composition via RRC signaling.

TABLE 2

Components for RE mapping and rate matching

| PDSCH contents | CORESET type | RNTI types | Rate matching and RE mapping |
| --- | --- | --- | --- |
| RMSI | MIB configured CORESET | SI-RNTI for SIB1 (or RMSI) | Behavior 1: Full SS burst set of the carrier band |
| SIBx, RACH msg2/4, paging, UE-specific dedicated message | MIB/RMSI configured CORESET | SI-RNTI for SIBx (x > 1), RA-RNTI, temporary C-RNTI, P-RNTI, C-RNTI | Behavior 2: According to a first indication of the SS burst set composition carried in RMSI |
| UE-specific dedicated message | RRC configured CORESET | C-RNTI | Behavior 3: According to a first indication of the SS burst set composition carried in RMSI, if a second indication by RRC is not received; according to a second indication of the SS burst set composition carried in RMSI, if the second indication by RRC has been received |

In one embodiment, instead of using a separate SI-RNTI for indicating the different rate matching behavior for SIB1 (or RMSI) PDSCH, the protocol may use the timing information of RMSI transmissions. The MIB-configured CORESETs are transmitted periodically in designated time slots, according to a configuration carried in PBCH. When the UE receives a DCI in PDCCH in MIB-configured CORESETs with SI-RNTI in these time slots, the UE may rate match around the full SS burst set composition for receiving the PDSCH scheduled by the DCI; when the UE receives a DCI with SI-RNTI in the other time slots, the UE may rate match around the SS blocks according to the first SS burst set composition. The rest of the UE behavior regarding the rate matching can be according to either TABLE 1 or TABLE 2. In one example, the SIB1 PDSCH timing is according to the following.

In an alternative embodiment, the different rate matching behavior for SIB1 (or RMSI) PDSCH from SIBx (x>1) PDSCH, one bit indication can be introduced in the DCI with SI-RNTI, which schedules the PDSCH. The one bit indication informs UE how to perform rate matching for receiving the PDSCH between: the UE assumes that no SS/PBCH block is transmitted in the allocated resources; and/or the UE assumes SS/PBCH block transmission according to the signaling in RMSI.

In some embodiments, the network may activate/deactivate a subset of SS blocks via MAC-CE in an SS burst set constructed according to the full set, the first indication or the second indication. In such a case, the rate matching behavior may also be further updated, according to the "activated SS blocks" only; the rate matching and RE mapping of the PDSCH is around the activated SS blocks, wherein the PDSCH is scheduled by a DCI with C-RNTI (or a DCI carried in an RRC configured CORESET).

In some embodiments, A UE may monitor PDCCH candidates in one or more of the following search spaces: a Type0-PDCCH common search space for a DCI format scrambled by a [SI-RNTI] on a primary cell; a Type1-PDCCH common search space for a DCI format scrambled by a [RA-RNTI] on a primary cell; and/or a Type2-PDCCH common search space for a DCI format scrambled by a [INT-RNTI].

In one embodiment, type0 common search space is on the MIB-configured CORESETs and type1 common search space is on the RMSI (or SIB1) configured CORESETs.

In one embodiment, the PDSCH rate matching behavior is determined differently depending on the search space on which the PDCCH conveys DL scheduling assignment.

In one example, behavior 1 is used for receiving RMSI PDSCH scheduled by a PDCCH transmitted in the type0 PDCCH search space on the MIB configured CORESET. Behavior 2 is used for receiving PDSCHs with SI-RNTI for SIBx (x>1), RA-RNTI, temporary C-RNTI, P-RNTI, C-RNTI. In one alternative, all these PDSCHs are scheduled by PDCCHs transmitted in the type1 PDCCH search space on the RMSI (SIB1) configured CORESET. In another alternative, PDSCHs with SI-RNTI for SIBx (x>1) is scheduled by a PDCCH transmitted on the type0 PDCCH search space on the MIB configured CORESET; and PDSCHs with RA-RNTI, temporary C-RNTI, P-RNTI, C-RNTI, etc., are scheduled by a PDCCH transmitted on the type1 PDCCH search space on the RMSI (SIB1) configured CORESET. Behavior 3 is used for receiving PDSCHs with C-RNTI for receiving UE-specific dedicated data, scheduled by PDCCHs transmitted in UE-specific search space transmitted on RRC configured CORESET.

In one embodiment, a method indicate SS burst set composition in multiple subbands is considered in a wideband carrier are proposed.

In case the SS burst sets are transmitted by the same set of TXRUs in the wideb and carrier, due to the analog beamforming constraint, the SS blocks in the different BWPs may be beamformed with the same analog beam. Under this constraint, the SS burst set compositions are identical across subbands in the wideband carrier.

For a WB UEs that is configured with a single BWP across the full wide bandwidth, the signaling contents may be able to indicate the multiple frequency locations to map the SS blocks (SSBs). This can be realized by configuring a list of N the starting PRB indices (common PRB indexing) to map the N SSBs in the frequency domain (by RRC or SIB signaling).

In alternative embodiments, ending or center PRB indices may be indicated instead. Upon receiving this signaling the UE can assume that the SS burst set composition corresponding to full mapping, the first and the second indication is applicable to all the N SSBs in the frequency domain, and the UE may also assume that the SSBs with the same SSB index mapped to different subbands are QCL'ed in a set of parameters (which is a subset or a full set of delay, Doppler, average gain and spatial parameters). The UE may apply PDSCH rate matching according to these information, and also according to the aforementioned embodiment of the present disclosure.

In alternative embodiments, the network may have multiple TXRUs/TRPs. In such a case, the SS blocks across the carriers are not beamformed with the same beams. Hence, to let UE know the different assumptions on the QCL, the network may indicate the UE by a higher-layer signaling (e.g., RRC or SIBx signaling) to assume that the SSBs with the same SSB index mapped to different subbands are QCL'ed in a set of parameters.

Figure 8:
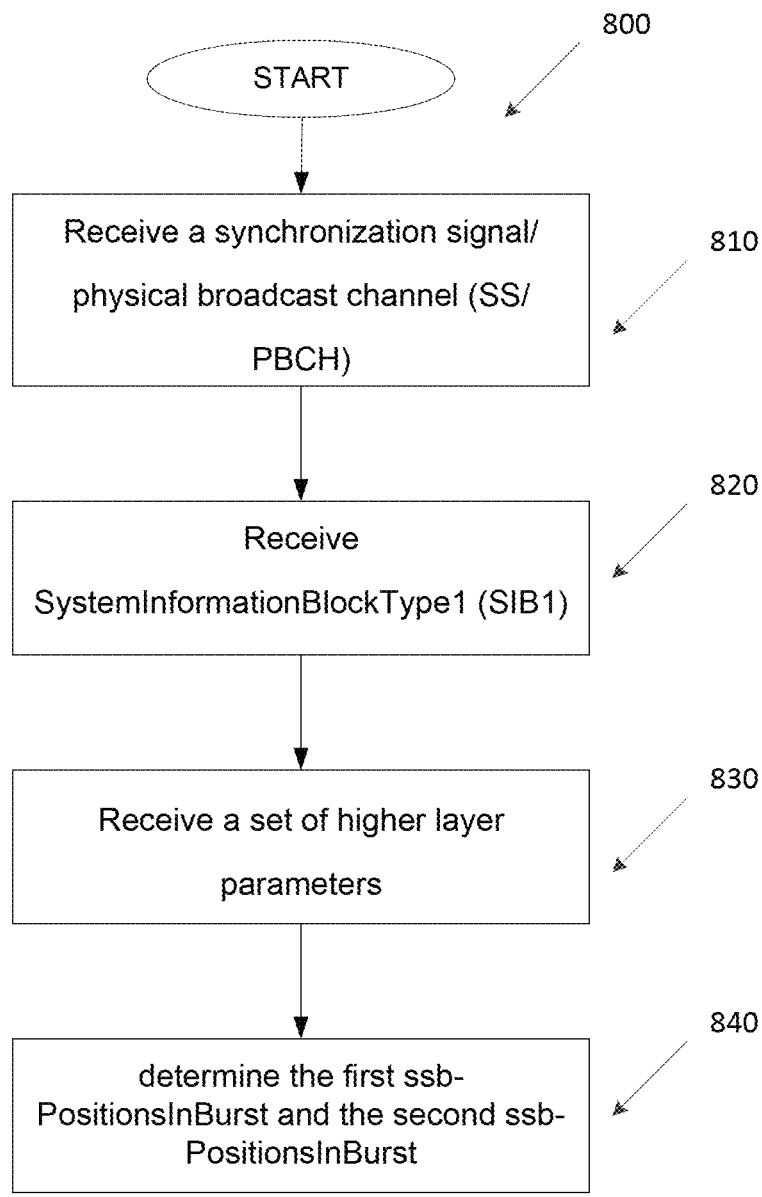
FIG. 8 illustrates a flow chart of a method for RE mapping and rate matching operation according to embodiments of the present disclosure.

FIG. 8 illustrates a flow chart of a method 800 for RE mapping and rate matching operation, as may be performed by a user equipment (UE), according to embodiments of the present disclosure. An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 8, the method 800 begins at step 810. In step 810, a UE (e.g. 111-116 as illustrated in FIG. 1) receives, from a base station (BS), a synchronization signal/physical broadcast channel (SS/PBCH) including a master information block (MIB).

In one embodiment, the UE in step 810, the UE receives, from the BS, a physical downlink shared channel (PDSCH). In such embodiment, the UE determines whether PDSCH resources allocated to the PDSCH are overlapped with SS/PBCH block transmission resources. In such embodiment, the UE determines that the PDSCH is rate matched when the PDSCH resources allocated to the PDSCH are overlapped with the SS/PBCH block transmission resources.

In one embodiment, the UE in step 810 determines a periodicity of SS/PBCH block transmission resources based on SSB-periodicity-serving-cell information received from the BS.

In one embodiment, the UE in step 810 determines whether a PDSCH conveys a random access response (RAR), other system information (OSI), paging information, and message 4 (Msg4). In one embodiment, the UE in step 810 applies the first ssb-PositionsInBurst for a SS/PBCH block transmission when the PDSCH conveys the RAR, the OSI, the paging information, and Msg4. In such embodiment, the SS/PBCH blocks are not transmitted in REs used by the UE when a PDSCH conveying an SIB1 is received, by the UE, for receiving of the PDSCH.

In one embodiment, the UE in step 810 determines whether the first ssb-PositionsInBurst and the second ssb-PositionsInBurst are received. The UE further determines whether at least one RE for monitoring a physical downlink control channel (PDCCH) candidate for a downlink control information (DCI) format with a cyclic redundancy check (CRC) that is not scrambled by a system information-radio network temporary identifier (SI-RNTI) on a serving cell overlaps with the at least one RE corresponding to an SS/PBCH block index provided by the first ssb-PositionsInBurst.

In such embodiment, the UE determines that the SS/PBCH block is not transmitted in REs used for monitoring the PDCCH candidate on the serving cell when the first ssb-PositionsInBurst and the second ssb-PositionsInBurst are not received for the serving cell and the UE monitors the PDCCH candidate for a Type0-PDCCH common search space on the serving cell.

In step 820, the UE receives, from the BS, SystemInformationBlockType1 (SIB1) comprising a first ssb-PositionsInBurst indicating indexes of SS/PBCH blocks for which the UE does not receive other signals or channels in resource elements (REs) that overlap with REs corresponding to the SS/PBCH blocks.

In step 830, the UE receives, from the BS, a set of higher layer parameters including a second ssb-PositionsInBurst indicating the indexes of the SS/PBCH blocks for which the UE does not receive the other signals or channels in the REs that overlap with the REs corresponding to the SS/PBCH blocks, wherein configuration information included in the second ssb-PositionsInBurst overrides configuration information included in the first ssb-PositionsInBurst.

In step 840, the UE determines the first ssb-PositionsInBurst and the second ssb-PositionsInBurst for receiving resource information.

Figure 9:
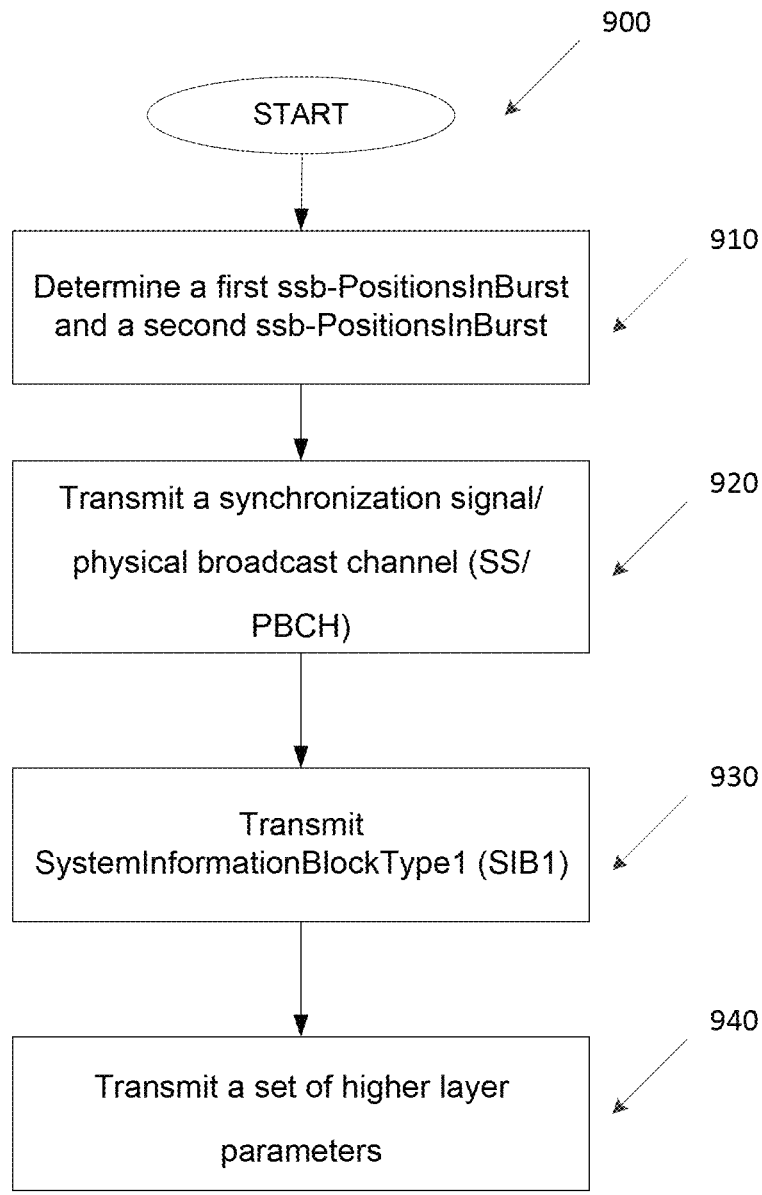
FIG. 9 illustrates another flow chart of a method for RE mapping and rate matching according to embodiments of the present disclosure.

FIG. 9 illustrates a flow chart of a method 900 for RE mapping and rate matching operation, as may be performed by a base station (BS), according to embodiments of the present disclosure. An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 9, a base station (BS) (e.g., 101-103 as illustrated in FIG. 1) begins the method 900.

In step 910, the BS determines a first ssb-PositionsInBurst and a second ssb-PositionsInBurst for transmitting resource information.

In one embodiment, the BS in step 910 further transmits, to the UE, a physical downlink shared channel (PDSCH). In such embodiment, PDSCH resources allocated to the PDSCH are overlapped with SS/PBCH block transmission resources and the PDSCH is rate matched when the PDSCH resources allocated to the PDSCH are overlapped with the SS/PBCH block transmission resources. In such embodiment, a periodicity of SS/PBCH block transmission resources is determined based on SSB-periodicity-serving-cell information transmitted to the UE.

In one embodiment, the BS in step 910 determines a PDSCH conveying a random access response (RAR), other system information (OSI), paging information, and message 4 (Msg4), and wherein the first ssb-PositionsInBurst for a SS/PBCH block transmission is applied by the UE when the PDSCH conveys the RAR, the OSI, the paging information, and Msg4.

In such embodiment, the SS/PBCH blocks are not transmitted in REs used by the UE when a PDSCH conveying an SIB1 is received, by the UE, for receiving of the PDSCH.

In one embodiment, the BS in step 910 13 transmits at least one RE for monitoring a physical downlink control channel (PDCCH) candidate, by the UE, for a downlink control information (DCI) format with a cyclic redundancy check (CRC) is not scrambled by a system information-radio network temporary identifier (SI-RNTI) on a serving cell overlaps with the at least one RE corresponding to an SS/PBCH block index provided by the first ssb-PositionsInBurst.

In step 920, the BS transmits, to a user equipment (UE), a synchronization signal/physical broadcast channel (SS/PBCH) including a master information block (MIB).

The BS in step 930 transmits, to the UE, SystemInformationBlockType1 (SIB1) comprising the first ssb-PositionsInBurst indicating indexes of SS/PBCH blocks.

The BS in step 940 transmits, to the UE, a set of higher layer parameters including the second ssb-PositionsInBurst indicating the indexes of the SS/PBCH blocks, wherein configuration information included in the second ssb-PositionsInBurst overrides configuration information included in the first ssb-PositionsInBurst.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for receiving resource information, the UE comprising:
    a transceiver configured to:
        receive, from a base station (BS), a synchronization signal/physical broadcast channel (SS/PBCH) including a master information block (MIB);
        receive, from the BS, SystemInformationBlockType1 (SIB1) comprising a first SS/PBCH burst set composition indicator (ssb-PositionsInBurst) indicating indexes of SS/PBCH blocks for which the UE does not receive other signals or channels in resource elements (REs) that overlap with REs corresponding to the SS/PBCH blocks; and
        receive, from the BS, a set of higher layer parameters including a second ssb-PositionsInBurst indicating the indexes of the SS/PBCH blocks for which the UE does not receive the other signals or channels in the REs that overlap with the REs corresponding to the SS/PBCH blocks, wherein configuration information included in the second ssb-PositionsInBurst overrides configuration information included in the first ssb-PositionsInBurst; and
    a processor operably connected to the transceiver, the processor configured to determine the first ssb-PositionsInBurst and the second ssb-PositionsInBurst for receiving resource information.

2. The UE of claim 1, wherein:
    the transceiver is further configured to receive, from the BS, a physical downlink shared channel (PDSCH); and
    the processor is further configured to:
        determine whether PDSCH resources allocated to the PDSCH are overlapped with REs corresponding to the SS/PBCH blocks; and
        determine that the PDSCH is rate matched when the PDSCH resources allocated to the PDSCH are overlapped with the REs corresponding to the SS/PBCH blocks.

3. The UE of claim 1, wherein the processor is further configured to determine a periodicity of SS/PBCH block transmission resources based on SSB-periodicity-serving-cell information received from the BS.

4. The UE of claim 1, wherein the processor is further configured to:
    determine whether a PDSCH conveys a random access response (RAR), other system information (OSI), paging information, and message 4 (Msg4); and
    apply the first ssb-PositionsInBurst for a SS/PBCH block transmission when the PDSCH conveys the RAR, the OSI, the paging information, and Msg4.

5. The UE of claim 1, wherein the SS/PBCH blocks are not transmitted in REs used by the UE when receiving a PDSCH conveying an SIB1.

6. The UE of claim 1, wherein the processor is further configured to:
    determine whether the first ssb-PositionsInBurst and the second ssb-PositionsInBurst are received; and
    determine whether at least one RE for monitoring a physical downlink control channel (PDCCH) candidate for a downlink control information (DCI) format with a cyclic redundancy check (CRC) that is not scrambled by a system information-radio network temporary identifier (SI-RNTI) on a serving cell overlaps with the at least one RE corresponding to an SS/PBCH block index provided by the first ssb-PositionsInBurst.

7. The UE of claim 6, wherein the processor is further configured to determine that the SS/PBCH block is not transmitted in REs used for monitoring the PDCCH candidate on the serving cell when the first ssb-PositionsInBurst and the second ssb-PositionsInBurst are not received for the serving cell and the UE monitors the PDCCH candidate for a Type0-PDCCH common search space on the serving cell.

8. A base station (BS) for transmitting resource information, the BS comprising:
    a processor configured to determine a first synchronization signal/physical broadcast channel (SS/PBCH) burst set composition indicator (ssb-PositionsInBurst) and a second ssb-PositionsInBurst for transmitting resource information; and
    a transceiver operably connected to the processor, the transceiver configured to:
        transmit, to a user equipment (UE), the SS/PBCH including a master information block (MIB);
        transmit, to the UE, SystemInformationBlockType1 (SIB1) comprising the first ssb-PositionsInBurst indicating indexes of SS/PBCH blocks; and
        transmit, to the UE, a set of higher layer parameters including the second ssb-PositionsInBurst indicating the indexes of the SS/PBCH blocks, wherein configuration information included in the second ssb-PositionsInBurst overrides configuration information included in the first ssb-PositionsInBurst.

9. The BS of claim 8, wherein the transceiver is further configured to transmit, to the UE, a physical downlink shared channel (PDSCH), and wherein:
    PDSCH resources allocated to the PDSCH are overlapped with REs corresponding to the SS/PBCH blocks; and
    the PDSCH is rate matched when the PDSCH resources allocated to the PDSCH are overlapped with the REs corresponding to the SS/PBCH blocks.

10. The BS of claim 8, wherein a periodicity of SS/PBCH block transmission resources is determined based on SSB-periodicity-serving-cell information transmitted to the UE.

11. The BS of claim 8, wherein the processor is further configured to determine a PDSCH conveying a random access response (RAR), other system information (OSI), paging information, and message 4 (Msg4), and wherein the first ssb-PositionsInBurst for a SS/PBCH block transmission is applied by the UE when the PDSCH conveys the RAR, the OSI, the paging information, and Msg4.

12. The BS of claim 8, wherein the SS/PBCH blocks are not transmitted in REs used by the UE when receiving a PDSCH conveying an SIB1.

13. The BS of claim 8, wherein the transceiver is further configured to transmit at least one RE for monitoring a physical downlink control channel (PDCCH) candidate, by the UE, for a downlink control information (DCI) format with a cyclic redundancy check (CRC) is not scrambled by a system information-radio network temporary identifier (SI-RNTI) on a serving cell overlaps with the at least one RE corresponding to an SS/PBCH block index provided by the first ssb-PositionsInBurst.

14. A method of a user equipment (UE) for receiving resource information, the method comprising:
  receiving, from a base station (BS), a synchronization signal/physical broadcast channel (SS/PBCH) including a master information block (MIB);
  receiving, from the BS, SystemInformationBlockType1 (SIB1) comprising a first SS/PBCH burst set composition indicator (ssb-PositionsInBurst) indicating indexes of SS/PBCH blocks for which the UE does not receive other signals or channels in resource elements (REs) that overlap with REs corresponding to the SS/PBCH blocks;
  receiving, from the BS, a set of higher layer parameters including a second ssb-PositionsInBurst indicating the indexes of the SS/PBCH blocks for which the UE does not receive the other signals or channels in the REs that overlap with the REs corresponding to the SS/PBCH blocks, wherein configuration information included in the second ssb-PositionsInBurst overrides configuration information included in the first ssb-PositionsInBurst; and
  determining the first ssb-PositionsInBurst and the second ssb-PositionsInBurst for receiving resource information.

15. The method of claim 14, further comprising:
  receiving, from the BS, a physical downlink shared channel (PDSCH); and
  determining whether PDSCH resources allocated to the PDSCH are overlapped with REs corresponding to the SS/PBCH blocks; and
  determining that the PDSCH is rate matched when the PDSCH resources allocated to the PDSCH are overlapped with the REs corresponding to the SS/PBCH blocks.

16. The method of claim 14, further comprising determining a periodicity of SS/PBCH block transmission resources based on SSB-periodicity-serving-cell information received from the BS.

17. The method of claim 14, further comprising:
  determining whether a PDSCH conveys a random access response (RAR), other system information (OSI), paging information, and message 4 (Msg4); and
  applying the first ssb-PositionsInBurst for a SS/PBCH block transmission when the PDSCH conveys the RAR, the OSI, the paging information, and Msg4.

18. The method of claim 14, wherein the SS/PBCH blocks are not transmitted in REs used by the UE when receiving a PDSCH conveying an SIB1.

19. The method of claim 14, further comprising:
  determining whether the first ssb-PositionsInBurst and the second ssb-PositionsInBurst are received; and
  determining whether at least one RE for monitoring a physical downlink control channel (PDCCH) candidate for a downlink control information (DCI) format with a cyclic redundancy check (CRC) that is not scrambled by a system information-radio network temporary identifier (SI-RNTI) on a serving cell overlaps with the at least one RE corresponding to an SS/PBCH block index provided by the first ssb-PositionsInBurst.

20. The method of claim 19, further comprising determining that the SS/PBCH block is not transmitted in REs used for monitoring the PDCCH candidate on the serving cell when the first ssb-PositionsInBurst and the second ssb-PositionsInBurst are not received for the serving cell and the UE monitors the PDCCH candidate for a Type0-PDCCH common search space on the serving cell.

* * * * *